United States Patent
Godlieb et al.

(10) Patent No.: US 10,084,401 B2
(45) Date of Patent: Sep. 25, 2018

(54) ELECTRIC SHAVER

(71) Applicant: KONINKLIJKE PHILIPS N.V., Eindhoven (NL)

(72) Inventors: Robert Godlieb, Eindhoven (NL); Jan Geert Hagting, Eindhoven (NL); Jeroen Christian Nijdam, Eindhoven (NL); Jasper Zuidervaart, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 16 days.

(21) Appl. No.: 15/123,707

(22) PCT Filed: Jan. 28, 2015

(86) PCT No.: PCT/EP2015/051665
§ 371 (c)(1),
(2) Date: Sep. 6, 2016

(87) PCT Pub. No.: WO2015/135682
PCT Pub. Date: Sep. 17, 2015

(65) Prior Publication Data
US 2017/0019044 A1    Jan. 19, 2017

(30) Foreign Application Priority Data
Mar. 14, 2014 (EP) .................................. 14159740

(51) Int. Cl.
*H02P 7/29* (2016.01)
*B26B 19/38* (2006.01)

(52) U.S. Cl.
CPC .............. *H02P 7/29* (2013.01); *B26B 19/388* (2013.01)

(58) Field of Classification Search
CPC ................................ H02P 7/29; B26B 19/388
USPC ........................................................ 30/45, 44
See application file for complete search history.

(56) References Cited

U.S. PATENT DOCUMENTS

| | | | |
|---|---|---|---|
| 5,274,735 A | 12/1993 | Okada | |
| 5,367,599 A | 11/1994 | Okada | |
| 5,671,535 A | 9/1997 | Van Der Borst | |
| 8,510,958 B2 * | 8/2013 | Hart | B26B 21/222 30/41.7 |
| 2012/0024552 A1 | 2/2012 | Kawano | |

(Continued)

FOREIGN PATENT DOCUMENTS

| | | | |
|---|---|---|---|
| JP | 60176495 A | 9/1985 | |
| JP | 0538387 A | 2/1993 | |
| JP | 05200168 A | 8/1993 | |

(Continued)

*Primary Examiner* — Omar Flores Sanchez (57) ABSTRACT

The invention relates to an electric shaver (1) comprising a cutter unit (3), an electric motor (4), a load detector arranged to detect a load current of the motor (4) and a controller. The controller switches the average voltage from a first level to a second level once the load current exceeds a first threshold value (TH_TH), and switches the average voltage from the second level back to the first level if the load current falls below a second threshold value (TH_TL) and stays below the second threshold value (TH_TL) for a predefined time period. By operating on a lower energy consumption when the cutter unit of the shaver is not in contact with the skin, energy is saved without the need for a proximity sensor.

15 Claims, 6 Drawing Sheets

(56) References Cited

U.S. PATENT DOCUMENTS

2017/0105823 A1* 4/2017 Lueckel .............. A46B 5/0095
2017/0113360 A1* 4/2017 Godlieb ................ B26B 19/388

FOREIGN PATENT DOCUMENTS

| JP | 07194862 A | 8/1995 |
| JP | 2002320399 A | 10/2002 |
| WO | 2014125772 A1 | 8/2014 |

* cited by examiner

ELECTRIC SHAVER

This application is the U.S. National Phase application under 35 U.S.C. § 371 of International Application No. PCT/EP2015/051665, filed on Jan. 28, 2015, which claims the benefit of International Application No. 14159740.1 filed on Mar. 14, 2014. These applications are hereby incorporated by reference herein.

FIELD OF THE INVENTION

The invention relates to household appliances and more particularly to an electric shaver.

BACKGROUND OF THE INVENTION

Many different shavers are available today. Shavers are available for shaving beards or hair on other parts of the body. Some shavers are designed for the male body and some for the female body and some for both. Besides shavers for humans, shavers for animals are available on the market that are particularly suited for shaving animals such as dogs. The present application relates to both human and non-human appliances.

For shaving human hair there is an optimal speed of the cutters. For rotary shaving systems this speed is in the range of 1800 to 2200 rpm. Shavers have been described that detect the presence of skin through a pressure switch or a proximity sensor that switches on the shaver when it detects skin contact in order to prolong battery life. This switching on needs to take place before the shaving heads contact the skin, because moving the shaver over skin when it is off is uncomfortable due to pulling and tugging. However, the use of a proximity sensor to achieve switching on of the shaver just prior to skin contact requires additional components.

U.S. 2012/0024552 A1 discloses an electrical power tool, in particular a lawn mower, including a motor, a motor load detecting unit, and a motor power supplying unit. The motor power supplying unit changes an amount of the driving voltage based on the motor load detected by the motor load detecting unit. In particular, the driving voltage is changed from a lower value to a higher value when the detected motor load is greater than a first threshold, and the driving voltage is changed from the higher value back to the lower value when the detected motor load is smaller than a second threshold smaller than the first threshold. Thus, the power supplying unit reduces the amount of the driving electrical power when determining that the motor runs idle.

U.S. Pat. No. 5,367,599 discloses an electric shaver provided with a motor that drives a cutter, and further provided with a motor current sensing circuit and a computation circuit which processes an output from the motor current sensing circuit. Based on the measured motor current, the computation circuit computes a thickness of the beard hairs of the user and sets the rotational speed of the motor to a lower value in the case of relatively thin beard hairs and to a higher value in the case of relatively thick beard hairs.

SUMMARY OF THE INVENTION

It is an object of the invention to provide a shaver that reduces power consumption in the absence of skin, without the use of a distance sensor. For this purpose, according to a first aspect of the invention, an electric shaver is provided comprising a cutter unit, an electric motor arranged to drive the cutter unit and a load detector arranged to measure at least one electric parameter indicative of a power consumption of the motor to obtain a measured value. The electric shaver also comprises a controller arranged to control an average voltage across the motor as a function of the measured value. The controller is arranged to switch the average voltage between a first average voltage level and a second average voltage level, the second average voltage level being higher than the first average voltage level, the controller being arranged to:
switch the average voltage from the first average voltage level to the second average voltage level if the measured value exceeds a first threshold value, and
switch the average voltage from the second average voltage level back to the first average voltage level if the measured value has stayed below a second threshold value during a predefined time period after a point in time at which the measured value has fallen below the second threshold value, wherein the second threshold value is higher than the first threshold value.

By measuring the power consumption of the motor, the load detector is able to detect skin contact, assuming that in the case of skin contact the power used by the motor is relatively high. So, by simply measuring an electric parameter, such as the current through the motor, skin contact is detected without the need for an additional distance sensor.

The electric shaver may comprise a controllable switch arranged to interrupt a voltage supplied across the motor, wherein the controller is arranged to switch the controllable switch on and off by way of a pulse width modulated control signal, a duty cycle of which determines the average voltage across the motor. By varying the duty cycle, the average voltage applied across the motor may be varied using a simple but robust digital controller.

In an embodiment, the electric shaver further comprises an analogue to digital converter arranged to receive the measured value from the load detector and convert the measured value into a digital output signal to be processed by the controller.

In an embodiment, the predefined time period lies in a range between 1-3 seconds, but other—longer or shorter—periods are possible. This period may be chosen to be long enough to avoid 'false positives', so that current deviations occurring during skin contact will not result in a change of the applied average voltage.

In an embodiment, the controller is arranged to wait for a first calibration trigger and, after receipt of the first calibration trigger, to:
set the average voltage to the second average voltage level, and then
wait for a motor current to settle, and next
sample the measured value over a predefined first sampling period to obtain a first number of samples, and then
average the first number of samples to obtain the second threshold value.

By determining the second threshold value during a calibration procedure, it is possible to optimize the second threshold value and be less dependent on fluctuations resulting e.g. from a lower battery voltage or temperature.

The second threshold value may be obtained by averaging the first number of samples to obtain a first average value and adding a predetermined first offset value to the first average value. Adding an offset value to the first average value will result in switching of the average voltage across the motor only when the load current has stayed below a level that is sufficiently higher than a nominal value. In this way, too frequent unwanted switching due to fluctuations in load current is avoided.

In an embodiment, the controller is arranged to wait for a second calibration trigger and, after receipt of the second calibration trigger, to:
set the average voltage to the first average voltage level, and then
wait for a motor current to settle, and next
sample the measured value over a predefined second sampling period to obtain a second number of samples, and then
average the second number of samples to obtain the first threshold value.

The first threshold value may be obtained by averaging the second number of samples to obtain a second average value and adding a predetermined second offset value to the second average value.

The first and/or second calibration trigger may be a power-on signal of the controller. In this way calibration takes place every time the shaver is turned on. Alternatively, the shaver may comprise a calibration switch coupled to the controller, the first and/or second calibration trigger being generated by the calibration switch upon activation of the calibration switch by a user.

In a specific embodiment, the controller is arranged to wait for a calibration trigger and, after receipt of the calibration trigger, to:
set the average voltage to the second average voltage level, and then
wait for a motor current to settle, and next
sample the measured value over a predefined first sampling period to obtain a first number of samples, and then
average the first number of samples to obtain a first average value and add a predetermined first offset value to the first average value to obtain the second threshold value, and subsequently
set the average voltage to the first average voltage level after the predefined first sampling period, and then
wait for the motor current to settle, and next
sample the measured value over a predefined second sampling period to obtain a second number of samples, and then
average the second number of samples to obtain a second average value and add a predetermined second offset value to the second average value to obtain the first threshold value.

By first determining the second threshold value and subsequently the first threshold value, the average voltage level first needs to be set to the higher average voltage level (i.e. the second average voltage level), and subsequently to the lower average voltage level (i.e. the first average voltage level). By virtue of this order, the total calibration time will be minimized. However, it is noted that it is also possible to first determine the first threshold value and subsequently the second threshold value.

The electric shaver may comprise a rechargeable battery to supply the power to the motor. Alternatively, the shaver may be connectable to the mains for powering the motor. Combinations are possible as well.

The electric shaver may be an electric razor or it may be a trimmer.

Further preferred embodiments of the device and method according to the invention are given in the appended claims.

BRIEF DESCRIPTION OF THE DRAWINGS

These and other aspects of the invention will be apparent from and elucidated further with reference to the embodiments described by way of example in the following description and with reference to the accompanying drawings, in which.

The figures are purely diagrammatic and not drawn to scale. In the Figures, elements which correspond to elements already described may have the same reference numerals.

DETAILED DESCRIPTION OF EMBODIMENTS

Figure 1:
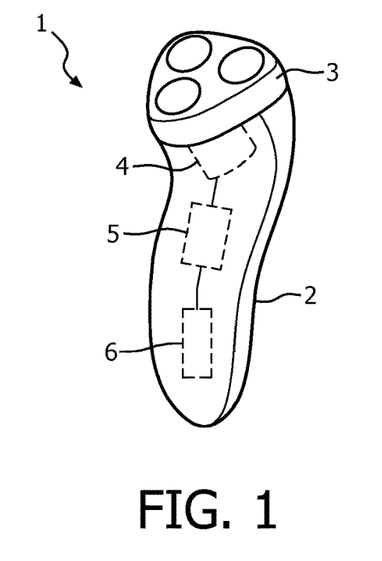
FIG. 1 is a perspective view of a shaver according to an embodiment of the invention.

FIG. 1 is a perspective view of a shaver 1 according to an embodiment of the invention. The shaver 1 comprises a housing 2 and a cutter unit 3. Inside the housing an electric motor 4 is located which is arranged to drive the cutter unit 3. Control circuitry 5 and a battery 6 are also located in the housing 2. The control circuitry 5 is arranged to control the motor 4 by controlling an average voltage applied across the motor 4.

Figure 2:
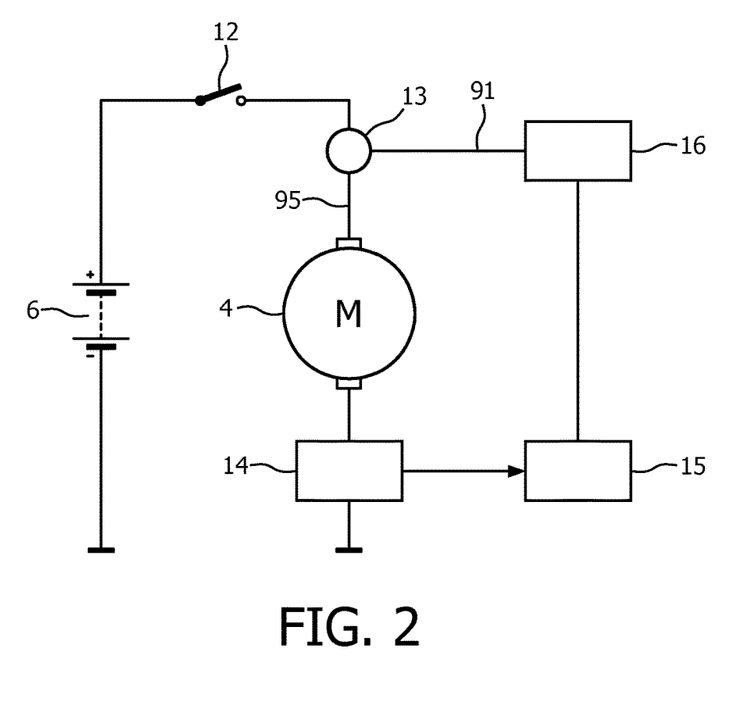
FIG. 2 schematically shows the electric components of the shaver of FIG. 1.

FIG. 2 schematically shows the electric components of the shaver of FIG. 1. As can be seen from FIG. 2, the battery 6 is connected to the motor 4 via an ON/OFF switch 12 and a controllable switch 13. A load detector 14 is arranged between the motor 4 and ground. Furthermore, the shaver 1 comprises an AD converter 15 and a controller 16. The controllable switch 13, the load detector 14, the AD converter 15 and the controller 16 constitute the control circuitry 5 shown in FIG. 1. The battery 6 may provide a voltage between 3.7 and 4.4 Volt, but other values are also possible such as 1.2 or 1.5 Volt.

The load detector 14 is arranged to measure a power consumption of the motor 4 by way of measuring a load current. The current through the motor 4 can be used as the sensed input parameter for the AD converter 15. A more refined method would be to calculate the power consumption of the motor by measuring both the current through the motor 4 and the voltage across the motor 4, however, given the flat characteristic of the motor 4, the current through the motor 4 is a good enough value.

The AD converter 15 is arranged to receive an actual motor current value from the load detector 14 and convert received analogue values into digital values. The controller 16 receives the digital values and will process them. The controller 16 is arranged to control the average voltage across the motor 4 by switching the controllable switch 13 ON and OFF by varying the duty cycle, or by varying the peak voltages. The controllable switch 13 may be a transistor or any other type of switch that can be switched with an electrical control signal. The controller 16 is arranged to switch the average voltage applied across the motor 4 between a first average voltage level and a second average voltage level, the second average voltage level being higher than the first average voltage level. The controller 16 is arranged to switch the average voltage from the first average voltage level to the second average voltage level if the load current exceeds a first threshold value TH_TH, and to switch the average voltage from the second average voltage level back to the first average voltage level if the load current falls below a second threshold value TH_TL and stays below the second threshold value TH_TL for a predefined time period.

Figure 3:
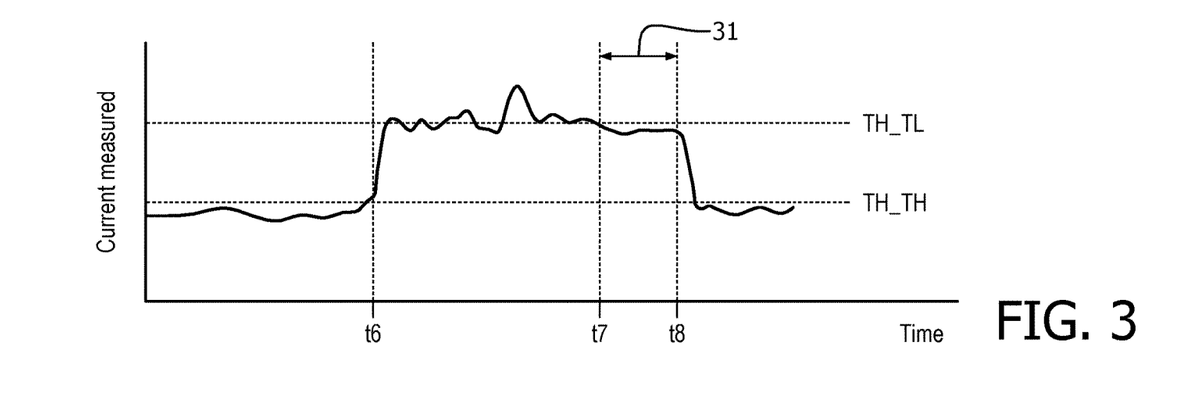
FIG. 3 shows a graph of the current measured by the load detector during a test of the shaver 1 according to an embodiment.
Figure 4:
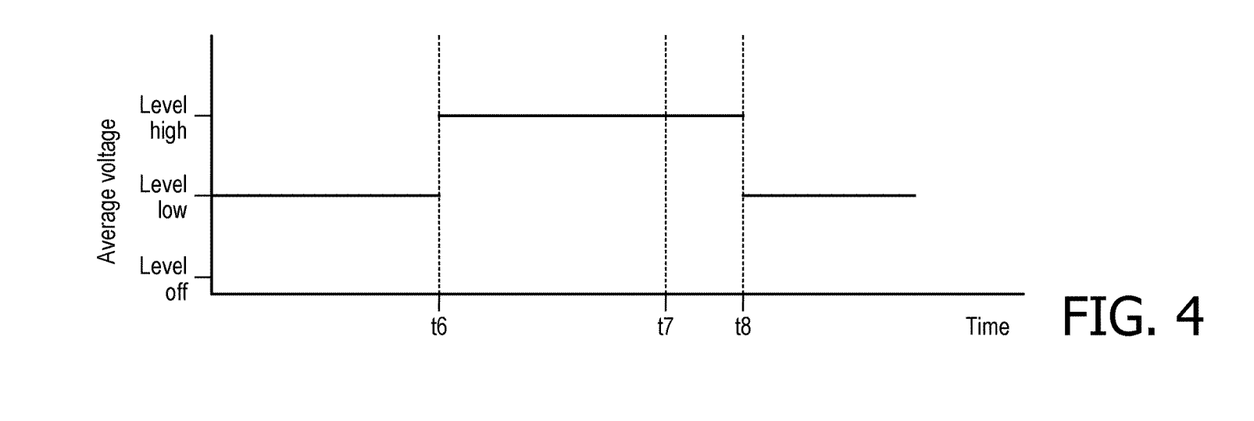
FIG. 4 shows a graph of an example of the average voltage level across the motor as a function of time.

In an embodiment, when the user switches on the shaver 1, the shaver 1 starts to operate at the lowest average voltage level, i.e. the first average voltage level. The first average voltage level may be chosen so that it is still comfortable for placing the shaver on the skin. In an embodiment, FIG. 3 shows a graph of the current measured by the load detector 14 during a test of the shaver 1 according to an embodiment. FIG. 4 shows a graph of the average voltage level across the motor 4 as a function of time. As can be seen from FIG. 3, the current exceeds the threshold TH_TH at a time t6. At that moment, the average voltage is switched from the low average voltage level to the high average voltage level, see FIG. 4. During shaving, the load current will fluctuate due to fluctuations in load experienced by the cutter unit 3 and the motor 4. At a time t7 the load current falls below the threshold TH_TL. The load current stays below this threshold TH_TL as can be seen from FIG. 3. At a time t8, after a predefined time period of t8–t7, the controller 16 will switch the motor to the low average voltage level again, see FIG. 4. The dropping of the load current at t7 is thought to be caused by the removal of the shaver 1 from the skin (e.g. beard) of the user. However, only after the load current has been below the threshold TH_TL for a long enough time, it can be concluded that the shaver has been removed from the skin. In an embodiment, the predefined time period lies in a range between 1-3 seconds, but other—longer or shorter—periods are possible. Values for the predefined time period may be defined during lab testing by the manufacturer. Multiple values for the predefined time period may be stored in a memory in the shaver 1, which are to be selected by the user by means of a user interface or a manually operable setting means.

By using a sensing method for determining the actual motor power consumption, it can be detected by the shaver 1 without any additional sensor that the shaving heads of the cutter unit are in contact with the skin and are shaving. When the controller 16 detects skin contact, the shaver 1 is switched to the higher average voltage level for shaving. The higher average voltage level may be a maximum average voltage level possible for the shaver 1 or, alternatively, the higher average voltage level may be lower than the maximum average voltage level, depending on the shaver and/or the user. By using a sensing method to determine the actual motor power consumption during this higher average voltage level, it can be detected when the shaver 1 has been taken off the skin by the user and the shaver 1 can ramp down again to the more energy efficient average voltage level. When the user switches off the shaver 1, the shaver 1 will stop.

In an embodiment, the controller 16 is a micro-processor arranged to regulate (i.e. control) the speed of the motor 4 by using pulse width modulation (PWM). Within the constraints of using a relatively low-cost processor, however, the motor voltage regulation is relatively slow; a practical value of the PWM is e.g. 8 kHz.

Figure 5:
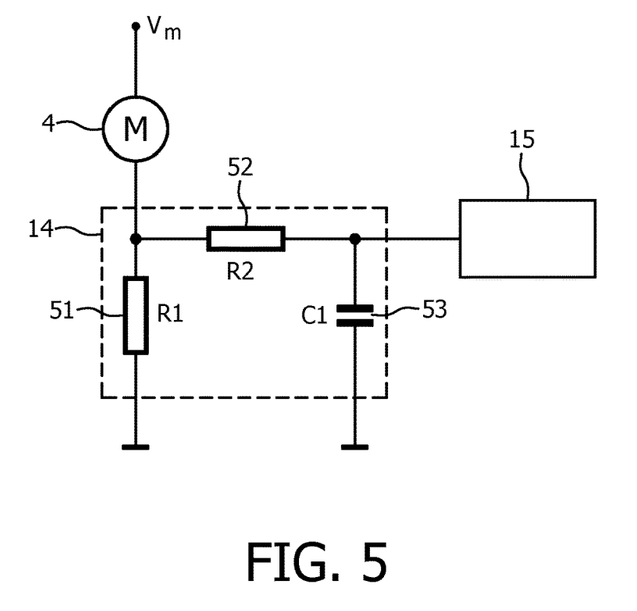
FIG. 5 shows an example of the load detector together with the motor 4 and the AD converter.

FIG. 5 shows an example of the load detector 14 together with the motor 4 and the AD converter 15. The load detector 14 comprises a first resistor 51 coupled between the motor 4 and ground, a second resistor 52 coupled to the motor 4 and an input of the AD converter 15. Between the input of the AD converter 15 and ground, a capacitor 53 is coupled. The AD converter 15 will receive a voltage that directly relates to the voltage over the resistor 51 and thus to the voltage over the motor 4, assuming the second resistor 52 is large enough. The second resistor 52 forms a low-pass filter together with the capacitor 53. Adding this filter will help in establishing a stable current measurement and avoiding audible acoustic 'whine' from the appliance. Practical values for the first resistor 51, the second resistor 52 and the capacitor 53 are R1=0.5 Ohm, R2=1000 Ohm, C1=10 microfarad with an average motor voltage $V_a$ in a range between 3.7 to 4.2 Volt. The AD converter 15 is arranged to sample the voltage values received and convert them into digital values to be processed by the controller 16. The AD converter 15 may be a separate device but it may alternatively be integrated into a single processor together with the controller 16.

Figure 6:
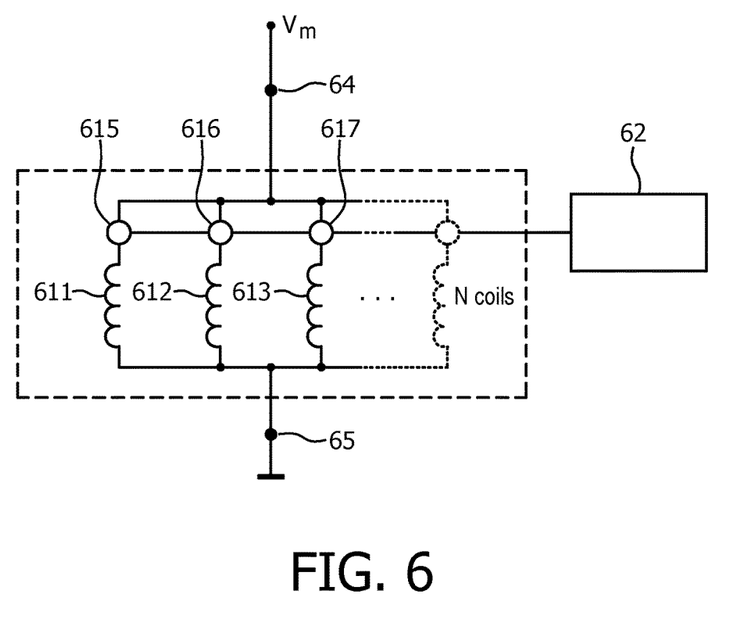
FIG. 6 schematically shows part of a further embodiment in which an electronically commutated brushless motor (ECM) is arranged in the shaver.

The embodiment described with reference to FIG. 2 may apply to a brushed DC motor that is controlled with PWM and with the single switch 13. FIG. 6 schematically shows part of a further embodiment in which an electronically commutated brushless motor (ECM) 61 is arranged in the shaver 1, the speed of which is controlled by a further controller 62. The ECM motor 61 comprises N coils 611, 612, 613 and N switches 615, 616, 617, with N being 3 or more. Note that FIG. 6 shows a simplified scheme and that the ECM motor 61 may have a wye or delta configuration. The further controller 62 is arranged to control the ECM motor 61 by sequentially switching the individual coils 611, 612, 613. Zero-passes of the coils 611, 612, 613 may be used to determine the speed of the motor 61 and control the switching, but this is not the most practical solution. A more robust and low-cost method to determine the power consumption of the ECM motor 61 is to measure the current going into the motor 61 prior to—or after—the action of splitting signals and introducing them into the individual coils. Measurement point 64 and measurement point 65 indicate possible points where the load detector 14 may be arranged. Given the switching nature of the ECM motor 61, also in this embodiment, the low-pass filter described in FIG. 5 will help to improve the operation of the shaver 1.

Detection of the trigger condition to move from the low to the high power mode can most simply be based on the absolute consumed power or load current level. This may however be sensitive to variations per individual product and variations over time. When implemented in this simple way it may not be a very robust method. To address these variations, the shaver according to an embodiment is arranged to determine the relevant threshold values TH_TH and TH_TL mentioned above, in a calibration procedure.

Figure 7:
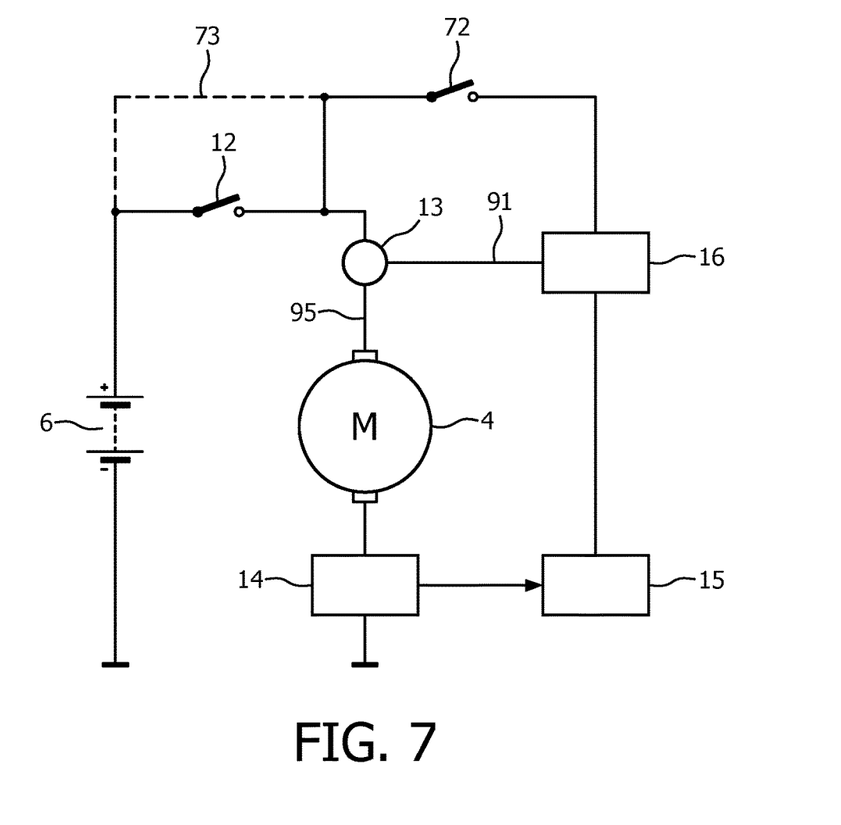
FIG. 7 schematically shows the electric components of the shaver according to a further embodiment.

FIG. 7 schematically shows the electric components of the shaver 1 according to a further embodiment. The shaver 1 comprises a calibration switch 72 coupled to the controller 16. The calibration switch 72 may be a button in the housing 2 of the shaver 1 to be pressed by a user so as to activate the calibration procedure. As indicated by the dashed line 73, the calibration switch 72 may bypass the ON/OFF switch 12. In that case, the user is able to activate the calibration procedure also when the shaver 1 is not activated.

In an embodiment, the controller 16 is arranged to wait for a first calibration trigger and, after receipt of the first calibration trigger, to:
  set the average voltage to the second average voltage level, and then
  wait for the motor current to settle, and next
  sample the measured value over a predefined first sampling period to obtain a first number of samples, and then
  average the first number of samples to obtain the second threshold value.

By determining the second threshold value during a calibration procedure, it is possible to optimize the second threshold value and be less dependent on fluctuations caused e.g. by a lower battery voltage or temperature. The second threshold value may be obtained by averaging the first number of samples to obtain a first average value and adding a predetermined first offset value to the first average value. Adding an offset value to the first average value will result in switching of the voltage across the motor only when the load current has stayed below a level that is sufficiently higher than the nominal value. In this way, too frequent unwanted switching due to fluctuations in load current is avoided.

In an embodiment, the controller is arranged to wait for a second calibration trigger and, after receipt of the second calibration trigger, to:
  set the average voltage to the first average voltage level, and then
  wait for the motor current to settle, and next
  sample the measured value over a predefined second sampling period to obtain a second number of samples, and then
  average the second number of samples to obtain the first threshold value.

The first threshold value may be obtained by averaging the second number of samples to obtain a second average value and adding a predetermined second offset value to the second average value.

Figure 8A:
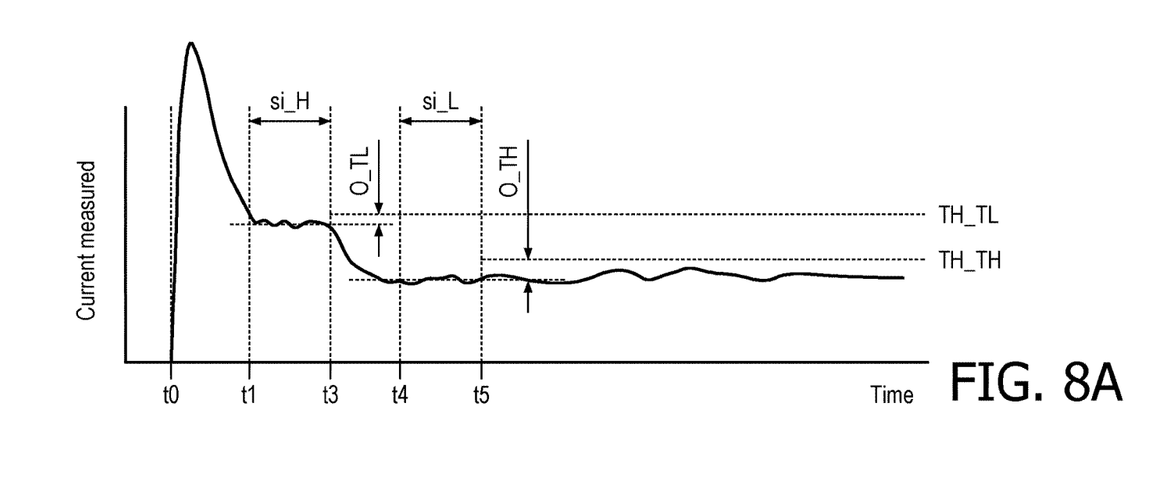
FIG. 8A shows a graph of a measured current through the motor of the shaver according to an embodiment.
Figure 8B:
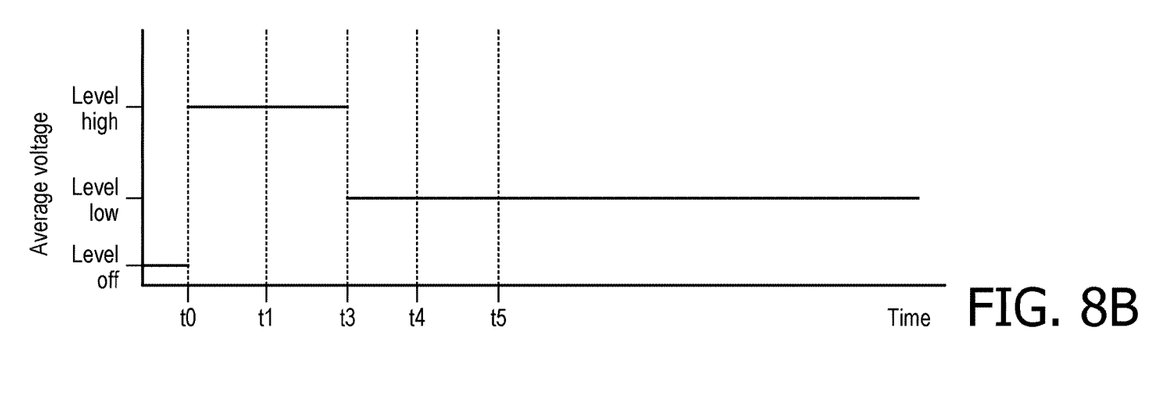
FIG. 8B shows a graph of the controlled average voltage level to produce the measured current of FIG. 8A.

FIG. 8A shows a graph of a measured current through the motor 4 of the shaver 1 according to an embodiment. The shaver 1 in this example was controlled in a manner indicated by FIG. 8B which shows a graph of the controlled average voltage level. After switch-on of the shaver 1, at a moment t0, the average voltage level is set to the highest voltage setting. As can be seen from FIG. 8A, when a voltage is applied to the motor 4, the initial current does not reflect the nominal operation values but has a distinct start-up behavior. This start-up effect needs to be taken into account when calibrating the threshold values for the switching algorithm. So, the controller 16 will wait for the start-up effect of the motor to disappear, until t1 (typically 200 ms), before a first number of samples are obtained. In other words, the controller waits for the motor current to settle. Over a first sampling period si_H, the load current is repeatedly measured to obtain the first number of samples. For the high setting (si_H may be typically 300 ms) e.g. 5 samples may be taken within the period si_H. At a moment t3 the threshold value for switching to a low (TH_TL) is determined by taking the average measured current and adding an offset value O_TL. If the AD converter 15 and an 8-bit digital microcontroller are used for the controller 16, to produce the wanted average voltage level, the average current as measured may have a value of 160, and after adding an offset value of 3 a threshold TH_TL equal to 163 is obtained. At a moment t3 the motor 4 is set to the low setting (e.g. 160 in an 8-bit range). Now, during an interval equal to t4–t3 (typically 200 ms), the motor current is allowed to settle to a nominal operation value for this new setting. Next, from t4 to t5, during a second sampling period si_L, a second number of samples is measured. The time period si_L may be typically 300 ms and over that sampling interval e.g. 5 samples may be acquired. At or after moment t5, the threshold value for switching to high (TH_TH) is determined by taking the average measured current and adding an offset value O_TH. With the presence of the AD converter 15 and the settings referred to above, a measured value may be 140, to which an offset value of 10 is added resulting in a TH_TH of 150. Depending on the requested sensitivity, the values for the offset values O_TL and O_TH may vary between 1.5 and 4% of the nominal operation values.

To minimize the time that is needed for calibrating, the high threshold TH_TL value may be determined first, followed by determining the low threshold TH_TH value. By applying the highest average voltage directly at start up, the start-up effect disappears quickest. However, alternatively, the low threshold TH_TH may be determined first. In order to know when the motor current has settled to the nominal operation values, different techniques could be used. A graph could be made of the motor current as a function of time (such as FIG. 8A), and from that graph the manufacturer can determine the time period (e.g. t1–t0) after which the motor current has settled to a specific level. Alternatively, samples could be taken from the load current, and deviations can be calculated. If the deviation of e.g. the last 5 samples is within certain limits, such as less than 12% of a nominal current value, than it could be concluded that the motor current has settled to the requested level.

Figure 9:
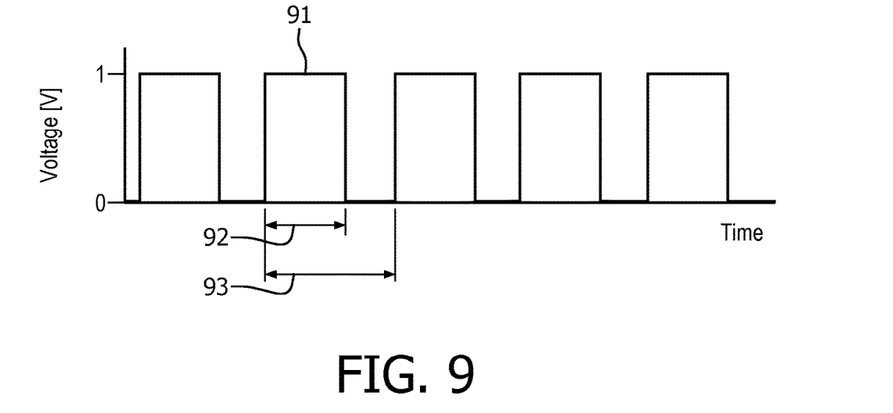
FIG. 9 shows an example of a pulse created by a digital microprocessor which may be used to switch the controllable switch.
Figure 10:
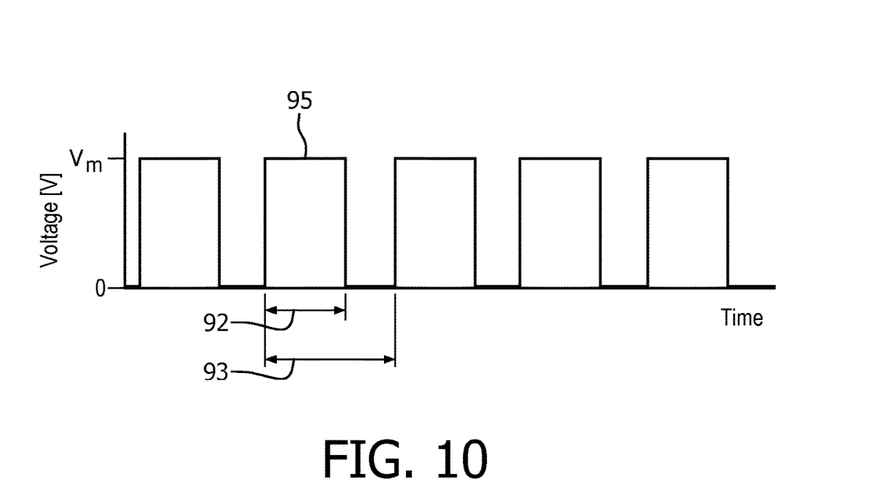
FIG. 10 shows a graph of a pulse width modulated motor voltage which is the result of the switching of the controllable switch when the switch is being controlled by the signal shown in FIG. 9.

As mentioned above, the controller 16 may be arranged to control the average voltage across the motor 4 by means of applying a pulse width modulated voltage across the motor 4. FIG. 9 shows an example of a pulse created by a digital microprocessor which may be used to switch the controllable switch 13. FIG. 9 shows a control signal 91 of the microprocessor 16. FIG. 10 shows a graph of a pulse width modulated motor voltage 95 which is the result of the switching of the controllable switch 13 when being controlled by the signal 91 shown in FIG. 9. As can be seen, the voltage varies between zero and a maximum value $V_m$, which may correspond to the battery voltage.

In FIGS. 9 and 10, a duty cycle is indicated by reference number 92, while reference number 93 indicates a cycle time. The term duty cycle describes the proportion of 'on' time to the regular interval or period of time. Duty cycle may be expressed in percent, 100% being fully ON. By applying the signal 91 to the controllable switch 13, the voltage applied to the motor 4 is intermittently switched on and off. This may be done relatively fast (e.g. at 10 kHz), with the on-time of a period being controlled. Thus, in this case the ratio between the duty-cycle and the cycle time is the controlled parameter. An average voltage $V_a$ fed to the motor 4 can be controlled by turning the switch 13 between battery 6 on and off. If for example the duty cycle is 50%, the average voltage will be equal to $0.5 \times V_m$. The longer the switch 13 is on compared to the off periods, the higher the average voltage applied across the motor 4 is. It is noted that in these calculations the average voltage is measured across one cycle.

In an embodiment, the control signal 91 is controlled with an 8-bit value pulse width modulator (not shown), thus giving a resolution of 255 steps in duty cycle to cycle time ratio. FIGS. 9 and 10 show an example of a duty cycle 92 equal to 160 and of a cycle time equal to 255.

Instead of using a microprocessor/controller as discussed above, another type of circuitry could be used to control the voltage of the motor 2, such as switching banks of resistors or analog electronics, but such solutions will be less robust and more costly.

Alternatives may comprise a power supply arranged to switch between a high and a low DC average voltage level as a function of the measured value. In that case, the above mentioned 'average voltage level' is identical to the DC average voltage level.

It is noted that in this document the word 'comprising' does not exclude the presence of elements or steps other than those listed and the word 'a' or 'an' preceding an element does not exclude the presence of a plurality of such elements, and that any reference signs do not limit the scope of the claims. Furthermore, the invention is not limited to the embodiments, and the invention lies in each and every novel feature or combination of features described above or recited in mutually different dependent claims.

The invention claimed is:

1. An electric shaver comprising:
   a cutter unit;
   an electric motor arranged to drive the cutter unit;
   a load detector arranged to measure at least one electric parameter indicative of a power consumption of the motor to obtain a measured value;
   a controller arranged to control an average voltage across the motor as a function of the measured value, the controller being arranged to switch the average voltage between a first average voltage level and a second average voltage level, the second average voltage level being higher than the first average voltage level, the controller being arranged to:
   switch the average voltage from the first average voltage level to the second average voltage level if the measured value exceeds a first threshold value (TH_TH), and
   switch the average voltage from the second average voltage level back to the first average voltage level if the measured value has stayed below a second threshold value (TH_TL) during a predefined time period after a point in time at which the measured value has fallen below said second threshold value (TH_TL), wherein said second threshold value (TH_TL) is higher than said first threshold value (TH_TH).

2. The electric shaver according to claim 1, wherein the shaver comprises a controllable switch arranged to interrupt a voltage supplied across the motor, and wherein the controller is arranged to switch the controllable switch on and off by way of a pulse width modulated control signal, a duty cycle of which determines the average voltage across the motor.

3. The electric shaver according to claim 1, wherein the shaver further comprises an analogue to digital converter arranged to receive the measured value from the load detector and convert the measured value into a digital output signal to be processed by the controller.

4. The electric shaver according to claim 1, wherein the predefined time period lies in a range between 1-seconds.

5. The electric shaver according to claim 1, wherein the controller is arranged to wait for a first calibration trigger and, after receipt of the first calibration trigger, to:—
   set the average voltage to the second average voltage level, and then
   wait for a motor current to settle, and next
   sample the measured value over a predefined first sampling period to obtain a first number of samples, and then
   average the first number of samples to obtain the second threshold value (TH–TL).

6. The electric shaver according to claim 5, wherein the second threshold value (TH–TL) is obtained by averaging the first number of samples to obtain a first average value and by adding a predetermined first offset value to the first average value.

7. The electric shaver according to claim 1, wherein the controller is arranged to wait for a second calibration trigger and, after receipt of the second calibration trigger, to:
   set the average voltage to the first average voltage level, and then
   wait for a motor current to settle, and next
   sample the measured value over a predefined second sampling period to obtain a second number of samples, and then
   average the second number of samples to obtain the first threshold value (TH–TH).

8. The electric shaver according to claim 7, wherein the first threshold value (TH–TH) is obtained by averaging the second number of samples to obtain a second average value and by adding a predetermined second offset value to the second average value.

9. The electric shaver according to claim 1, wherein the first and/or second calibration trigger is a power-on signal of the controller.

10. The electric shaver according to claim 5, wherein the shaver comprises a calibration switch coupled to the controller and arranged to generate the first and/or second calibration trigger upon activation of the calibration switch by a user.

11. The electric shaver according to claim 1, wherein the controller is arranged to wait for a calibration trigger and, after receipt of the calibration trigger, to:
   set the average voltage to the second average voltage level, and then
   wait for a motor current to settle, and next
   sample the measured value over a predefined first sampling period to obtain a first number of samples, and then
   average the first number of samples to obtain a first average value and add a predetermined first offset value to the first average value to obtain the second threshold value (TH–TL), and subsequently
   set the average voltage to the first average voltage level after the predefined first sampling period, and then
   wait for the motor current to settle, and next
   sample the measured value over a predefined second sampling period to obtain a second number of samples, and then—average the second number of samples to obtain a second average value and add a predetermined second offset value to the second average value to obtain the first threshold value (TH–TH).

12. The electric shaver according to claim 11, wherein the calibration trigger is a power-on signal of the controller.

13. The electric shaver according to claim 11, wherein the shaver comprises a calibration switch coupled to the controller and arranged to generate the calibration trigger upon activation of the calibration switch by a user.

14. The electric shaver according to claim 1, wherein the electric shaver comprises a rechargeable battery to supply power to the motor.

15. The electric shaver according to claim 1, wherein the electric shaver is a razor or a trimmer.

* * * * *